(12) United States Patent
Ji et al.

(10) Patent No.: US 12,075,372 B2
(45) Date of Patent: Aug. 27, 2024

(54) SYNCHRONIZING WIRELESS COMMUNICATIONS BETWEEN ELECTRONIC DEVICES

(71) Applicant: Apple Inc., Cupertino, CA (US)

(72) Inventors: Zhu Ji, Cupertino, CA (US); Jianxiong Shi, Cupertino, CA (US); Miao Yao, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 134 days.

(21) Appl. No.: 17/384,617

(22) Filed: Jul. 23, 2021

(65) Prior Publication Data
US 2023/0043319 A1    Feb. 9, 2023

(51) Int. Cl.
*H04W 56/00*    (2009.01)
*H04J 13/00*    (2011.01)
*H04L 27/26*    (2006.01)

(52) U.S. Cl.
CPC ....... *H04W 56/001* (2013.01); *H04J 13/0062* (2013.01); *H04L 27/2607* (2013.01); *H04L 27/2634* (2013.01)

(58) Field of Classification Search
None
See application file for complete search history.

(56) References Cited

U.S. PATENT DOCUMENTS

| | | | | |
|---|---|---|---|---|
| 9,369,325 | B2 * | 6/2016 | Kim | H04L 5/0053 |
| 2014/0355710 | A1 * | 12/2014 | Takata | H04L 5/0035 375/267 |
| 2019/0260628 | A1 * | 8/2019 | Lin | H04L 27/2613 |
| 2021/0068169 | A1 * | 3/2021 | Wang | H04L 27/2607 |
| 2021/0105825 | A1 * | 4/2021 | Wang | H04L 27/2613 |

FOREIGN PATENT DOCUMENTS

| | | | | |
|---|---|---|---|---|
| WO | WO2018064582 | * | 1/2018 | H04W 28/04 |
| WO | WO2018064582 A1 * | | 1/2018 | H04W 28/04 |
| WO | WO2018064582 A1 * | | 4/2018 | H04W 28/04 |

OTHER PUBLICATIONS

Ericsson, "On NTN synchronization, random access, and timing advance," 3GPP TSG-RAN WG1 Meeting #99, R1-1912725, Reno, USA, Nov. 18-22, 2019, 21 pages.

* cited by examiner

*Primary Examiner* — Abdelillah Elmejjarmi
(74) *Attorney, Agent, or Firm* — Fish & Richardson P.C.

(57) ABSTRACT

In an example method, a first device determines a first Zadoff-Chu sequence having a first root value, and a second Zadoff-Chu sequence having a second root value, where the second root value is an inverse modulus of the first root value. Further, the first device generates a wireless signal including (i) a first preamble generated based, at least in part, on the first Zadoff-Chu sequence, (ii) a second preamble generated based, at least in part, on the second Zadoff-Chu sequence, and (iii) a payload. Further, the first device transmits the wireless signal from the first device to a second device.

20 Claims, 9 Drawing Sheets

SYNCHRONIZING WIRELESS COMMUNICATIONS BETWEEN ELECTRONIC DEVICES

TECHNICAL FIELD

The disclosure relates to systems and techniques for managing wireless communication links, including synchronizing wireless communications between electronic devices.

BACKGROUND

Electronic devices can communicate with one another through one or more wireless communications links. As an example, a first electronic device can establish a wireless communications link (e.g., a satellite communications link, a cellular communications link, or a Wi-Fi link) with a second electronic device. The first electronic device can transmit data to and/or receive data from the second electronic device via the wireless communications link.

SUMMARY

Systems, methods, devices and non-transitory, computer-readable media are disclosed for synchronizing communications between electronic devices.

In some aspects, a method includes determining, using a first device, a first Zadoff-Chu sequence having a first root value; determining, using the first device, a second Zadoff-Chu sequence having a second root value, where the second root value is an inverse modulus of the first root value; generating, using the first device, a wireless signal including (i) a first preamble generated based, at least in part, on the first Zadoff-Chu sequence, (ii) a second preamble generated based, at least in part, on the second Zadoff-Chu sequence, and (iii) a payload; and transmitting the wireless signal from the first device to a second device.

Implementations of these aspects can include one or more of the following features.

In some implementations, generating the wireless signal can include at least one of: performing a first cyclic shift on the first preamble according to a shift value, or performing a second cyclic shift on the second preamble according to the shift value.

In some implementations, the wireless signal can be transmitted from the first device to a second device according to a data rate. The shift value can be determined based, at least in part, on the data rate.

In some implementations, the shift value can be selected from among a plurality of candidate shift values. Each of the candidate shift values can correspond to a different respective data rate for transmitting the wireless signal from the first device to the second device.

In some implementations, the candidate shift values can define an arithmetic sequence.

In some implementations, the first preamble can precedes the second preamble.

In some implementations, the first preamble and the second preamble can precede the payload.

In some implementations, the wireless signal can be generated independent of determining a Fourier transform of the first preamble.

In some implementations, at least one of the first device or the second device can be a base station of a wireless network.

In some implementations, at least one of the first device or the second device can be a user equipment (UE) of a wireless network.

In some implementations, the method can be performed, at least in part, by a baseband processor of the first device.

In further aspects, a method include receiving, from a first device by a second device, a wireless signal including (i) a first preamble generated based, at least in part, on a first Zadoff-Chu sequence having a first root value, (ii) a second preamble generated based, at least in part, on a second Zadoff-Chu sequence having a second root value, where the second root value is an inverse modulus of the first root value, and (iii) a payload; generating, using the second device, data representing a product of the second preamble and the second Zadoff-Chu sequence; determining, using the second device, one or more synchronization parameters for the wireless signal based, at least in part, on the product of the second preamble and the second Zadoff-Chu sequence; and decoding, using the second device, the payload based, at least in part, on at one or more synchronization parameters.

Implementations of these aspects can include one or more of the following features.

In some implementations, decoding the payload portion can include determining at least one of: a first cyclic shift associated with the first preamble, or a second cyclic shift associated with the second preamble.

In some implementations, decoding the payload can include determining a shift value of at least one of the first cyclic shift or the second cyclic shift; and determining, based at least in part, on the determined shift value, a data rate for a transmission of the wireless signal from the first device to the second device.

In some implementations, the shift value can be selected from among a plurality of candidate shift values. Each of the candidate shift values can correspond to a different respective data rate for transmitting the wireless signal from the first device to the second device.

In some implementations, the candidate shift values can define an arithmetic sequence.

In some implementations, determining the first cyclic shift or the second cyclic shift can including determining a time offset value for the wireless signal, and identifying a first candidate shift value from among the candidate shift values that is nearest in value to the time offset value.

In some implementations, the one or more synchronization parameters can include a time offset value.

In some implementations, the one or more synchronization parameters can a frequency offset value.

In some implementations, determining the one or more synchronization parameters can including determining an inverse Fourier transform of the product of the second preamble and the second Zadoff-Chu sequence.

In some implementations, determining the one or more synchronization parameters can include determining one or more peaks of the inverse Fourier transform of the product of the second preamble and the second Zadoff-Chu sequence.

In some implementations, determining the one or more synchronization parameters can include determining the one or more synchronization parameters based, at least in part, on the one or more peaks.

In some implementations, at least one of the first root value or the second root value can be determined prior to receiving the wireless signal.

In some implementations, the first preamble can precede the second preamble.

In some implementations, the first preamble and the second preamble can precede the payload.

In some implementations, at least one of the first device or the second device can be a base station of a wireless network.

In some implementations, at least one of the first device or the second device can be a user equipment (UE) of a wireless network.

In some implementations, the method can be performed, at least in part, by a baseband processor of the second device.

Other implementations are directed to systems, devices and non-transitory, computer-readable media including computer-executable instructions for performing the techniques described herein.

Particular implementations provide at least the following advantages. For example, according to the techniques described herein, wireless communications between electronic devices can be synchronized by generating wireless signals with two preambles, where a first preamble includes a ZC sequence having a root u and the second preamble includes a ZC sequence having a root u', where u' is the inverse modulus of u. This can be advantageous, for example, as it enables a receiving device to estimate the time offset value and carrier frequency offset value $f_0$ for a wireless signal in a computationally efficient manner. For example, in at least some implementations, a time offset value $t_0$ and center frequency offset value $f_0$ can be estimated by performing a single inverse Fast Fourier transform (IFFT) operation (e.g., rather than multiple IFFT and/or Fast Fourier transport, FFT, operations). As the performance of FFT and IFFT operations may be computationally expensive (e.g., requiring the expenditure of a larger amount of computer processing resource and/or memory resources relative to other types of operations, such as multiplication), the techniques described herein technique can be performed more efficiently compared to techniques that require the performance of multiple FFT and/or IFFT operations.

The details of one or more embodiments are set forth in the accompanying drawings and the description below. Other features and advantages will be apparent from the description and drawings, and from the claims.

DETAILED DESCRIPTION

This disclosure describes methods and systems for synchronizing wireless communications between electronic devices. In at least some implementations, electronic devices can exchange data with one another by encoding the data in one or more signals and transmitting the signals wirelessly according to one or more wireless communications protocols. In particular, a wireless signal can include a payload (e.g., representing the data that is intended to be exchanged between the electronic devices), and at least two preambles that enable the receiving device to decode the payload. A first preamble can include a Zadoff-Chu sequence having a root u, and a second preamble includes a ZC sequence having a root u', where u' is the inverse modulus of u. The receiving device can determine, based on at least in part on the preambles, a time offset value $t_0$ and a carrier frequency offset value $f_0$ for the wireless signal, and synchronize communications with the transmitting device with respect to the time domain and the frequency domain.

Figure 1:
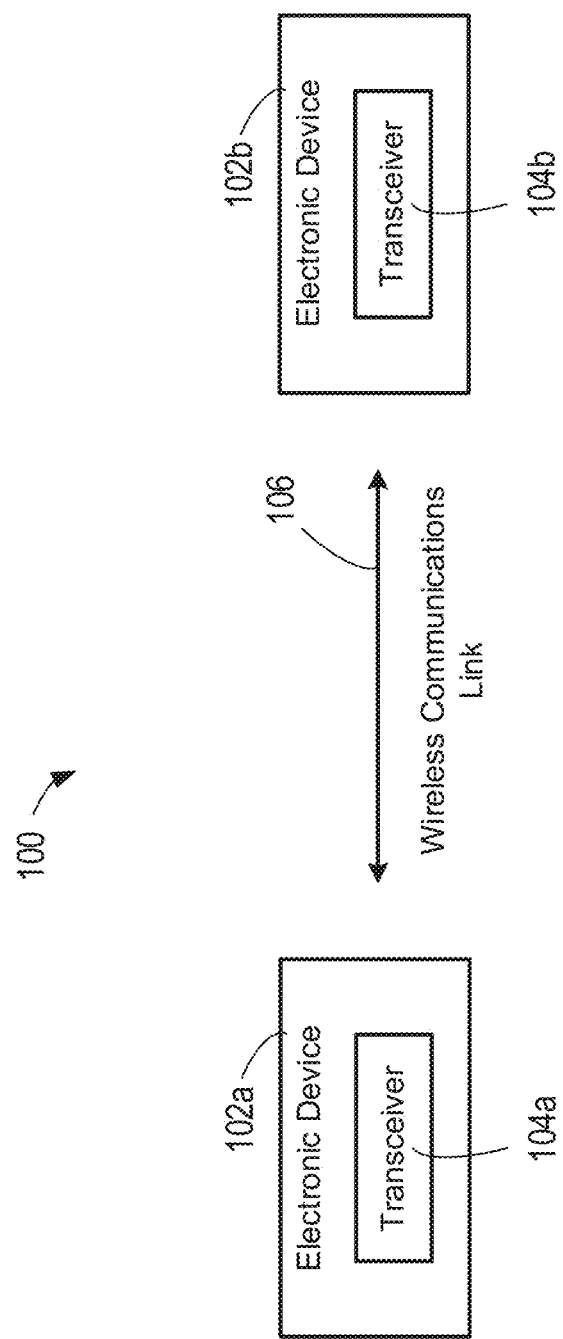
FIG. 1 is a diagram of an example system for transmitted data between electronic devices.

FIG. 1 shows an example system 100 for transmitting data between electronic devices. The system 100 includes a first electronic device 102a having a first wireless transceiver 104a, and a second electronic device 102b having a second wireless transceiver 104b.

The electronic devices 102a and 102b can communicate with one another via one or more wireless communications links. For example, using their wireless transceivers 104a and 140b, the electronic devices 102a can establish a wireless communications link 106 between them. Further, the electronic devices 102a and 102b can transmit data to and/or receive data from one another via the wireless communications link 106 (e.g., by encoding the data in one or more signals and transmitting the signals wirelessly according to one or more wireless communications protocols).

In practice, the electronic devices 102a and 102b can be any devices that are configured to receive, process, and transmit data. As an example, at least one of the electronic devices 102a or 102b can be a computing device, such as a client computing device (e.g., a desktop computer or a notebook computer), a server computing device (e.g., a server computer or cloud computing system), a mobile computing device (e.g., a cellular phone, smartphone, a tablet, a personal data assistant, or a notebook computer), a wearable computing device (e.g., a smart watch, a virtual reality headset, or an augmented reality headset), or other computing device capable of receiving, processing, and transmitting data. As another example, at least one of the electronic devices 102a or 102b can be a vehicle having wireless communications capabilities (e.g., a car, a truck, a motorcycle, a plane, a bicycle, a scooter, a boat, or any other vehicle that can transmit and receive data wirelessly using one or more wireless transmitters). As another example, at least one of the electronic devices 102a or 102b can be an access control system, a machine, an electro-mechanical device, or any combination thereof. As another example, at least one of the electronic devices 102a or 102b can be an accessory device having wireless communications capabilities (e.g., a headphone, an audio headset, an audio speaker, a camera, or a microphone, or any other accessory device that can transmit and receive data wirelessly using one or more wireless transmitters). As another example, at least one of the electronic devices 102a or 102b can be a satellite communications node (e.g., a ground based communications node that transmits and/or receives data from a satellite node, or an orbiting satellite node that transmits and/or receives data from a ground base communications node and/or another satellite node). In some implementations, at least one of the electronic devices 102a or 102b can operate using one or more operating systems (e.g., Apple macOS, Apple iOS, Microsoft Windows, Linux, Unix, Google Android, etc.) and one or more architectures (e.g., x86, PowerPC, ARM, etc.).

The wireless transceivers 104a and 104b can be configured to establish wireless communications links, and transmit and receive data via those wireless communications links according to any wireless communications protocol. In some implementations, the wireless transceivers 104a and 104b can be implemented using the wireless communications subsystems 824 described with reference to FIG. 8 (e.g., using one or more baseband processors of the wireless communications subsystems 824). Example wireless communications protocols include satellite communications protocols, cellular communications protocols (e.g., as defined by 3rd Generation Partnership Project (3GPP) technical standards, some other technical standard), and the Wi-Fi family of wireless network protocols (e.g., as defined by Institute of Electrical and Electronics Engineers (IEEE) 802.11 technical standards, or some other technical standard). Although FIG. 1 shows each of the electronic devices 102a and 102b as having a single respective wireless transceiver 104a or 104b, in practice, each of the electronic devices 102a and 102b can have any number of transceivers.

Figure 2:
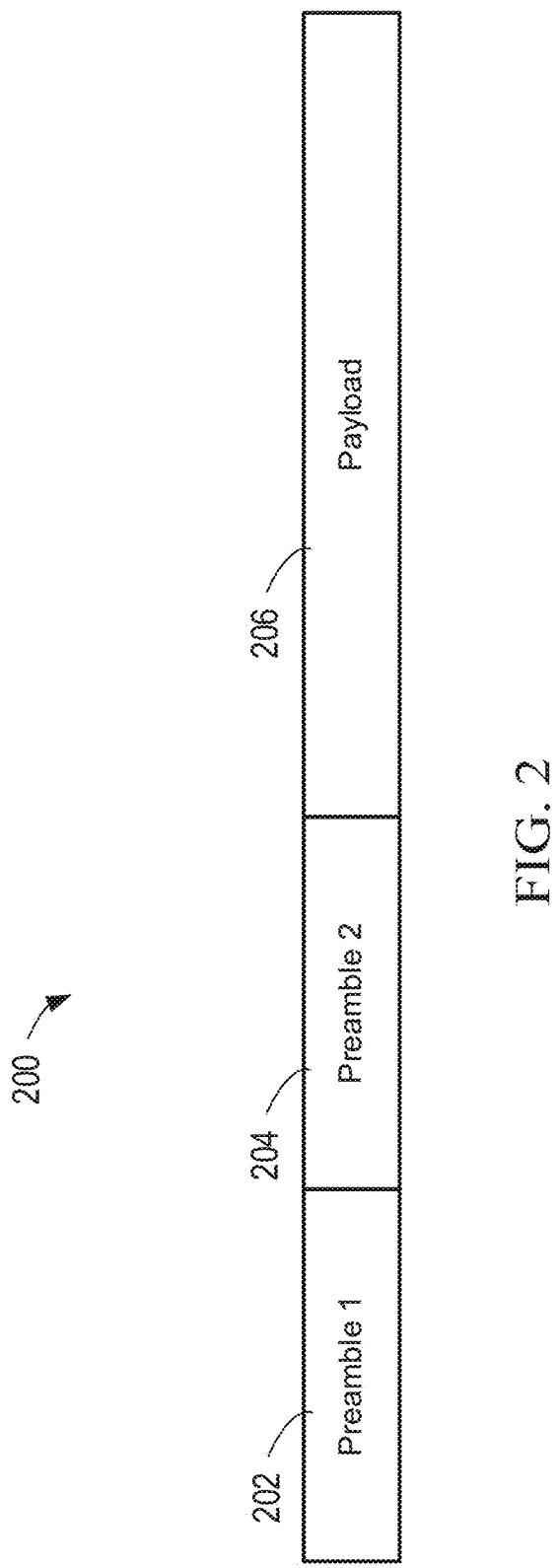
FIG. 2 is a schematic diagram of an example wireless signal.

As described above, the electronic devices 102a and 102b can exchange data with one another by encoding the data in one or more signals and transmitting the signals wirelessly according to one or more wireless communications protocols. A schematic representation of an example wireless signal 200 is shown in FIG. 2. In this example, the wireless signal 200 includes a first preamble 202, a second preamble 204, and a payload 206. Further, the first preamble 202, a second preamble 204, and a payload 206 can be arranged sequentially in time. For example, when the wireless signal 200 is transmitted between electronic devices, the first preamble 202 can be transmitted first in time, followed by the second preamble 204, and followed by the payload 206.

The payload 206 includes the data that is intended to be exchanged between the electronic devices 102a and 102b. In practice, the payload 206 can include any type of data. As an example, the payload 206 can include data representing any combination of textual information, images, videos, audio, or any other type of information.

The preambles 202 and 204 include information that enables the electronic devices 102a and 102b to synchronize wireless communications between one another, such that the payload 206 can be interpreted by the recipient of the wireless signal 200.

As an example, the preambles 202 and 204 can include information that enables the electronic devices 102a and 102b to synchronize communications with one another with respect to the time domain. For instance, when a wireless signal 200 is transmitted from the electronic device 102a to the electronic device 102b, there is a time delay between the time at which the wireless signal 200 is transmitted by the electronic device 102a and the time at which the wireless signal 200 arrives at the electronic device 102b (e.g., due to a propagation delay of the wireless signal 200 between the electronic devices 102a and 102b). The preambles 202 and 204 can include information that enables the electronic device 102b to determine the time(s) at which the wireless signal 200 can be sampled to account for the propagation delay between the electronic devices 102a and 102b. In some implementations, this timing information may be referred to as a "time offset" (TO) value, or $t_0$.

As another example, the preambles 202 and 204 can include information that enables the electronic devices 102a and 102b to synchronize communications with one another with respect to the frequency domain. For instance, the electronic device 102a can transmit the wireless signal 200 to the electronic device 102b according to a particular carrier frequency (e.g., using a local oscillator having that carrier frequency). Further, the electronic device 102b can interpret the received wireless signal 200 according to that carrier frequency (e.g., using a local oscillator having the same carrier frequency). However, as the wireless signal 200 propagates to the electronic device 102b, the carrier frequency of the wireless signal 200 may shift over time (e.g., due to Doppler shift). Accordingly, the carrier frequency for the wireless signal 200 that arrives at the electronic device 102b may differ from the frequency of the local oscillator of the electronic device 102b. Further, due to irregularities between the local oscillators of the electronic devices 102a and 102b, the carrier frequency for the wireless signal 200 (e.g., as generated by the electronic device 102a) may differ from the frequency of the local oscillator of the electronic device 102b. The preambles 202 and 204 can include information that enables the electronic device 102b to determine the difference between the carrier frequency of the wireless signal 200 and the frequency of the local oscillator of the electronic device 102b (e.g., due to Doppler shift and/or irregularities between the local oscillators). In some implementations, this frequency information may be referred to as a "carrier frequency offset" (CFO) value, or $f_0$.

Figure 3:
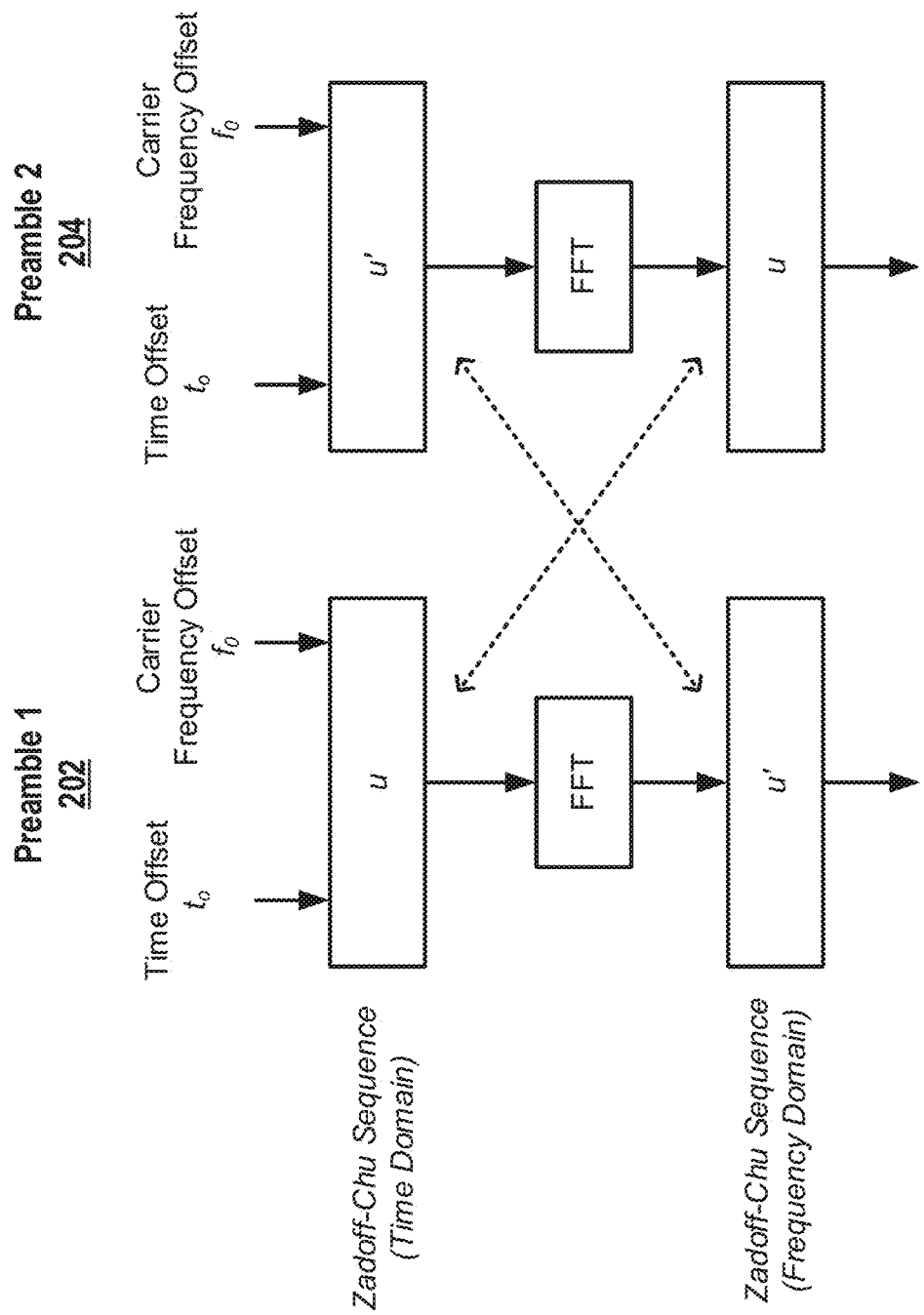
FIG. 3 is a diagram of an example process for generating preambles of a wireless signal.
Figure 4:
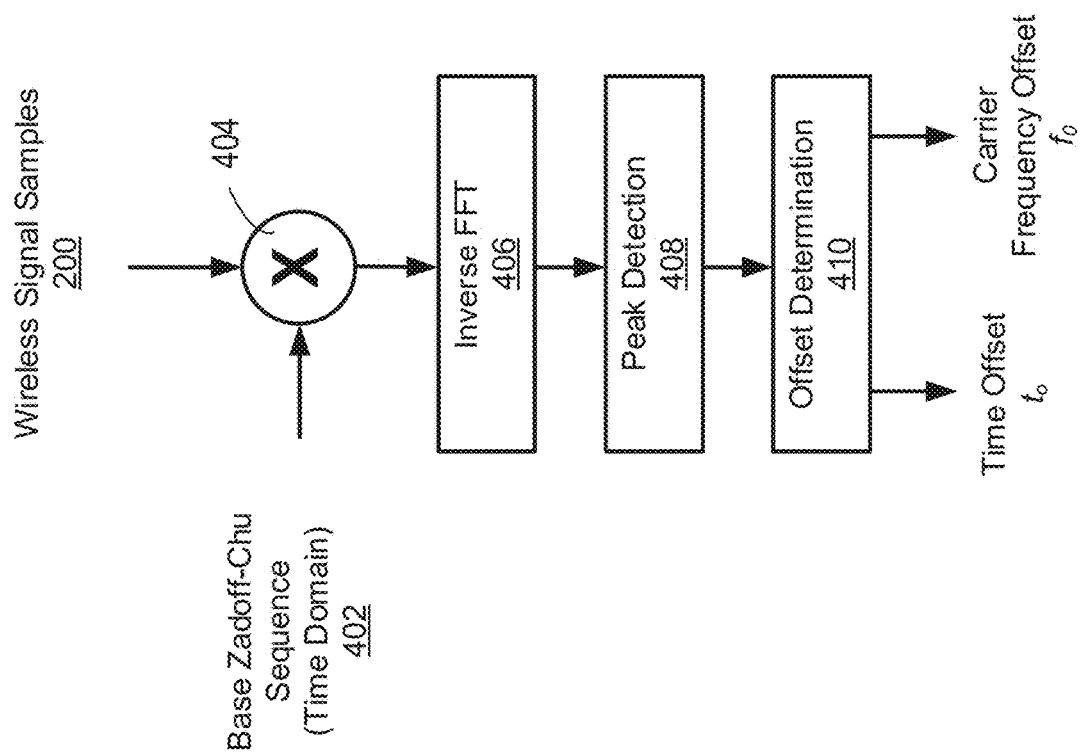
FIG. 4 is a diagram of an example process for estimating time offset values and carrier frequency offset values of a wireless signal based at least in part on the preambles of that wireless signal.

FIGS. 3 and 4 shows an example technique for generating the first preamble 202 and the second preamble 204 to include information regarding the TO value $t_0$ and the CFO value $f_0$.

In general, the first preamble 202 and the second preamble 204 can be generated using one or more Zadoff-Chu (ZC) sequences (sometimes referred to as Chu sequences or a Frank-Zadoff-Chu (FZC) sequences). A ZC sequence is a complex-valued mathematical sequence which, when applied to a signal, gives rise to a new signal of constant amplitude. When cyclically shifted versions of a ZC sequence are imposed upon a signal, the resulting set of signals detected at the receiver are uncorrelated with one another. In particular, ZC sequences exhibit the property that cyclically shifted versions of themselves are orthogonal to one another, provided that each cyclic shift, when viewed within the time domain of the signal, is greater than the combined propagation delay and multipath delay spread of the signal between the transmitting device and the receiving device.

A generated ZC sequence that has not been shifted is known as a root sequence. The complex value at each position n of each root ZC sequence parametrised by u is given by:

$$x_u(n) = \exp\left(-j\frac{\pi u n(n + c_f + 2q)}{N_{ZC}}\right), \quad \text{Eq. 1}$$

where:
$0 \le n < N_{ZC}$,
$0 < u < N_{ZC}$ and $\gcd(N_{ZC}, u) = 1$,
$c_f = N_{ZC} \bmod 2$,
$q \in \mathbb{Z}$, and
$N_{ZC}$ is the length of the ZC sequence or preamble.

Referring to FIG. 3, the first preamble 202 can be generated such that the first preamble 202 includes a ZC sequence in the time domain having a root u. Further, the second preamble 204 can be generated such that the second preamble 204 includes a ZC sequence in the time domain having a root u', where u' is the inverse modulus of u. A modular inverse of an integer b (modulo m) is the integer $b^{-1}$, such that $bb^{-1} \equiv 1 \pmod{m}$. In some implementations, the root u can be a predetermined value (e.g., a value that is communicated other otherwise provided to the transmitting device and the receiving device prior to the transmission of the wireless signal).

As shown in FIG. 3, when a ZC sequence in the time domain having a root u is Fourier transformed (e.g., via a Fast Fourier transformation, FFT), the result is a ZC sequence in the frequency domain having a root u'. Further, when a ZC sequence in the time domain having a root u' is Fourier transformed (e.g., via a FFT), the result is a ZC sequence having a root u. Accordingly, the second preamble 204 having a TO value $t_0$ and a CFO value $f_0$ is the equivalent of the FFT of the first preamble 202 having the same TO value $t_0$ and the same CFO value $f_0$. Further, the first preamble 202 having the TO value $t_0$ and the CFO value $f_0$ is the equivalent of the FFT of the second preamble 204 having the same TO value $f_0$ and the same CFO value $t_0$.

According to this relationship, (i) multiplying the second preamble 204 by a base ZC sequence and then performing an inverse Fourier transformation (e.g., an inverse Fast Fourier transform, IFFT) on the product is equivalent to (ii) the time domain correlation of the first preamble 202 (which typically is computed using a FFT and then an IFFT). Further, (i) multiplying the first preamble 202 by a base ZC sequence and then performing an IFFT on the product is equivalent to (ii) the time domain correlation of the second preamble 204.

The TO value $t_0$ and CFO value $f_0$ for the wireless signal 200 can be estimated based at least in part on the preambles 202 and 204 that are received by a receiving device. For example, referring to FIG. 4, a receiving device can sample the wireless signal 200 (including the preambles 202 and 204), and multiply the sampled wireless signal 200 by a base ZC sequence 402 in the time domain (e.g., using a multiple 404). In particular, the receiving device can multiply the second preamble 204 (which is the equivalent of the FFT of the first preamble 202) by a base ZC sequence 402 having a root u' (which is the equivalent of the FFT of a base ZC sequence 402 having a root u).

In some implementations, the roots u and u' can be predetermined (e.g., communicated other otherwise provided to both the transmitting device and the receiving device prior to the transmission of the wireless signal). Further, a base ZC sequence 402 having the root u and/or a base ZC sequence 402 having the root u' can be generated by the receiving device.

The product of the sampled wireless signal 200 and the base ZC sequence 402 can be inverse Fourier transformed (e.g., using an inverse Fast Fourier transform, IFFT, 406).

Further, the receiving device can determine one or more peaks of the inverse Fourier transformed signal (e.g., using a peak detection module 408). As an example, the peak detector 408 can identify one or more local maxima and/or an absolute maxima in the inverse Fourier transformed signal.

Further, the receiving device can determine the TO value $t_0$ and the CFO value $f_0$ based at least in part on the detected peaks (e.g., using an offset determination module 410).

As an example, the relationship between $idx_1$ (the peak index of inverse Fourier transformation of first preamble 202), root u, TO value $t_0$, and CFO value $f_0$ can be represented by the equation:

$$idx_1 = t_0 + u'^* f_0. \quad \text{Eq. 2}$$

Further, the relationship between $idx_2$ (the peak index of inverse Fourier transformation of second preamble 204), root u, TO value $t_0$, and CFO value $f_0$ can be represented by the equation:

$$idx_2 = t_0 - u'^* f_0 \quad \text{Eq. 3}$$

Accordingly, the TO value $t_0$ and CFO value $f_0$ can be estimated using the equations:

$$t_0 = \bmod((idx_1 + idx_2), N_{ZC}) \quad \text{Eq. 4}$$

$$f_0 = \bmod(u^*(idx_1 - idx_2), N_{ZC}) \quad \text{Eq. 5}$$

In turn, the receiving device can decode the payload 206 of the wireless signal 200 based at least in part on the estimated TO value $t_0$ and CFO value $f_0$. For example, the receiving device can determine, based at least in part on the estimated TO value $t_0$, to the time(s) at which to sample the wireless signal of the payload. As another example, the receiving device can determine, based at least in part on use the estimated CFO value $f_0$, the spectral components of the wireless signal that correspond to the carrier signal of the wireless signal 200.

As described above, wireless communications between electronic devices can be synchronized by generating wireless signals with two preambles, where a first preamble includes a ZC sequence having a root u and the second preamble includes a ZC sequence having a root u', where u' is the inverse modulus of u. This technique can be advantageous, for example, as it enables a receiving device to estimate the TO value $t_0$ and CFO value $f_0$ for a wireless signal in a computationally efficient manner. For example, as described with reference to FIG. 4, the TO value $t_0$ and CFO value $f_0$ can be estimated by performing a single IFFT operation (e.g., rather than multiple IFFT and/or FFT operations). As the performance of FFT and IFFT operations may be computationally expensive (e.g., requiring the expenditure of a larger amount of computer processing resource and/or memory resources relative to other types of operations, such as multiplication), the techniques described herein technique can be performed more efficiently compared to techniques that require the performance of multiple FFT and/or IFFT operations.

As an example, as an alternative to the techniques described herein, wireless communications between electronic devices could instead be synchronized by generating wireless signals with two preambles, where a first preamble includes a ZC sequence having a root u and the second preamble having a ZC sequence having a root −u (e.g., where u and −u are conjugate roots). However, according to this technique, a receiving device would perform at least two FFT and/or IFFT operations to estimate the TO value $t_0$ and CFO value $f_0$. For example, a receiving device would perform a FFT operation on the sampled wireless signal (e.g., to obtain a representation of the wireless signal in the frequency domain), and multiply the result of the first FFT operation with a base ZC sequence in the frequency domain. Further, the receiving device would perform a second IFFT operation on the product (e.g., to obtain a time domain signal), perform peak detection of the resulting signal, and estimate the TO value $t_0$ and CFO value $f_0$ based at least in part on the detected peaks. The performance of both the first FFT operation and the second IFFT operation can, in at least some implementations, increase the complexity of estimating the TO value $t_0$ and CFO value $f_0$.

As an example, the complexity of the techniques described herein can be expressed as $(\log_2 (N_{CZ}))+1$. In comparison, the complexity of the alternative technique described above (e.g., using ZC sequences having conjugate roots instead of inverse modulus roots) can be expressed as $2*(\log_2(N_{CZ}))+1$, an approximately two fold increase in complexity compared to that of the techniques described herein.

In the examples described above, the first preamble 202 and the second preamble 204 can be generated such that each of the preambles includes a respective Zadoff-Chu sequence. In some implementations, the first preamble 202 and the second preamble 204 can include Zadoff-Chu sequences that are cyclically shifted by a particular length, where the length depends on the data rate for transmitting the wireless signal 200.

As an example, for a first wireless signal that is to be transmitted according to a first data rate, the Zadoff-Chu sequences of the preambles 202 and 204 can be cyclically shifted by a first length. As another example, for a second wireless signal that is to be transmitted according to a second data rate that is different than the first data rate, the Zadoff-Chu sequences of the preambles 202 and 204 can be cyclically shifted by a second length that is different from the first length. This can be beneficial, for example, as it enables a receiving device to determine the data rate of a received wireless signal based on the extent that the preambles are cyclically shifted, such that the receiving device can correctly decode the payload of that wireless signal.

A cyclic shift can refer to the shifting a sequence of data, such that each data item (e.g., a bit) is shifted to the next sequence position, and whereby data items at the end of the sequence are moved to the first position in the sequence). For example, given a sequence of bits $b_1$, $b_2$, $b_3$, and $b_4$, a cyclic shift of length 1 would result in a sequence of bits $b_4$, $b_1$, $b_2$, and $b_3$. As another example, given a sequence of bits $b_1$, $b_2$, $b_3$, and $b_4$, a cyclic shift of length 2 would result in a sequence of bits $b_3$, $b_4$, $b_1$, and $b_2$.

In some implementations, the cyclic shift length for the preambles of a wireless signal can be selected using a mapping table. An example mapping table is shown below.

TABLE 1

Example mapping table.

| Data Rate | $R_1$ | $R_2$ | ... | $R_N$ |
|---|---|---|---|---|
| Cyclic Shift Length | $C_1$ | $C_2$ | ... | $C_N$ |

In this example, a transmitted device and receiving device are configured to exchange data according to different data rates $R_1$, $R_2$, ... $R_N$. Further, each of the data rates is mapped to a different cyclic shift length $C_1$, $C_2$, ... $C_N$, respectively. As an example, for a wireless signal transmitted according to a data rate $R_1$, the preambles of that wireless signal would be cyclically shifted by a length $C_1$. As another example, for a wireless signal transmitted according to a data rate $R_3$, the preambles of that wireless signal would be cyclically shifted by a length $C_3$.

In some implementations, the cyclic shift lengths $C_1$, $C_2$, ... $C_N$ can define an arithmetic sequence. For example, for an index value i≤n, $C_i-C_{i-1}=D$ (e.g., the cyclic shift length can increase in increments of D for each successively greater data rate $R_i$. Further, in some implementations, $D-N_{ZC}=C_N-C_1$.

In practice, a mapping table can include any number of data rates and corresponding cyclic shift lengths. As examples, a mapping table can include two, three, four, or more data rates and corresponding cyclic shift lengths.

Further, in practice, the data rates can corresponding cyclic shift lengths can vary. As an example, a mapping table can specify several data rates including 800 kbps, 400 kbps, 200 kbps, and 100 kbps, and corresponding cyclic shift lengths of 0, 100 milliseconds, 200 milliseconds, and 300 milliseconds, respectively (e.g., such that D=100 milliseconds). Other data rates and cyclic shift lengths also can be used, depending on the implementation.

Figure 5:
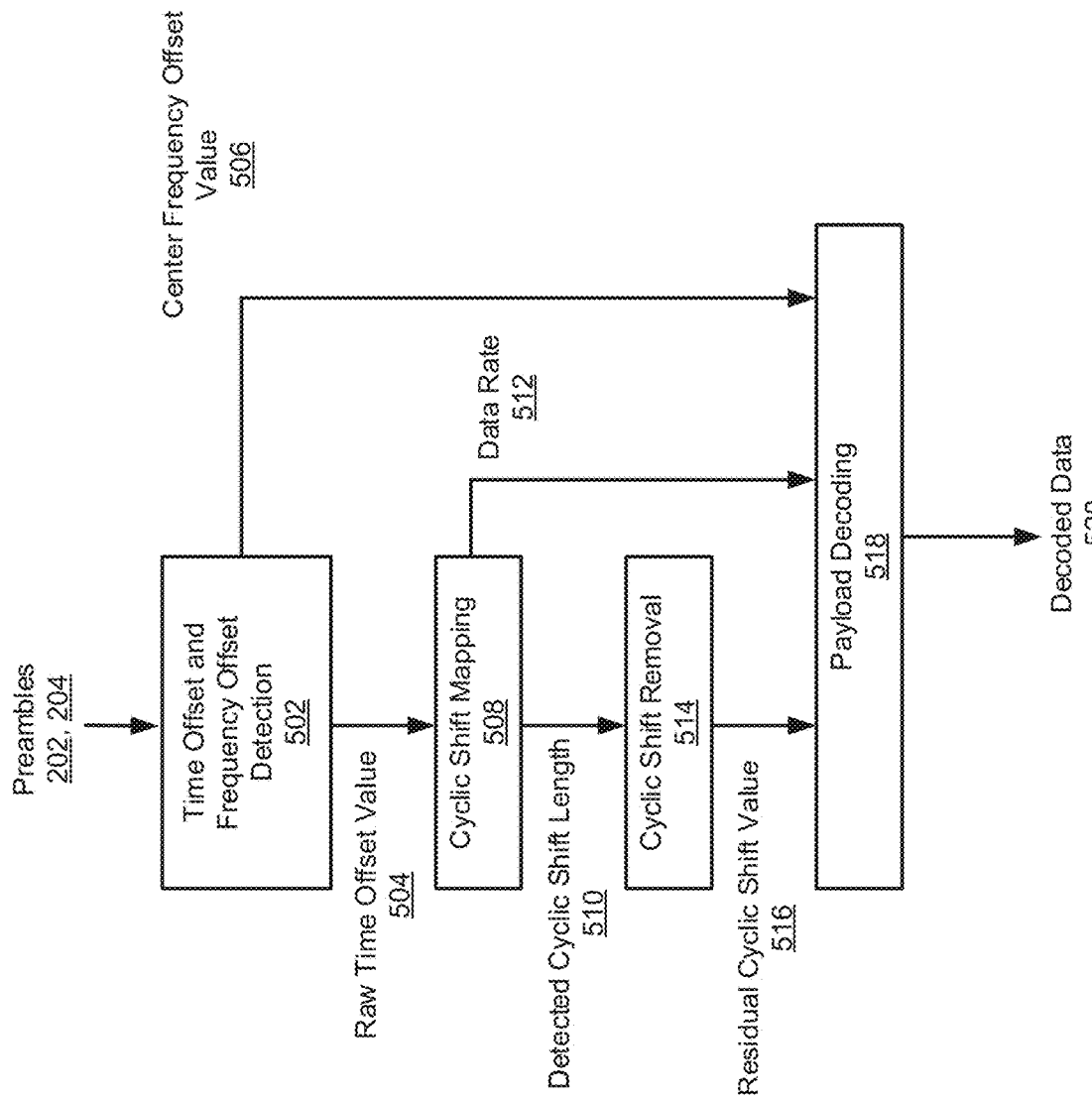
FIG. 5 is a diagram of an example process for determining a data rate of a wireless signal, estimating the time offset value and carrier frequency offset value of the wireless signal, and decoding the payload of the wireless signal.
Figure 6A:
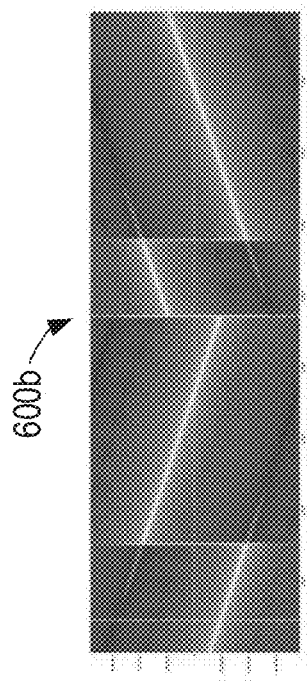
FIGS. 6A-6D are diagrams of the spectra of four example Zadoff-Chu sequences having different respective cyclic shifts.
Figure 6B:
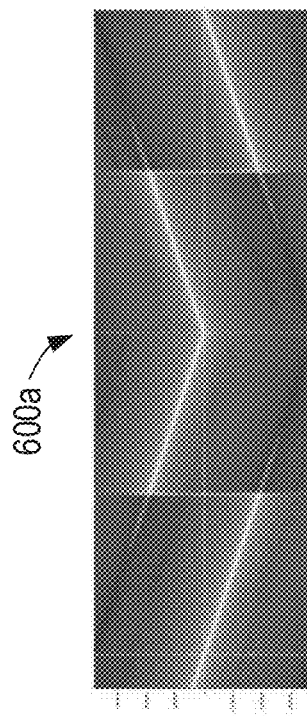
Figure 6C:
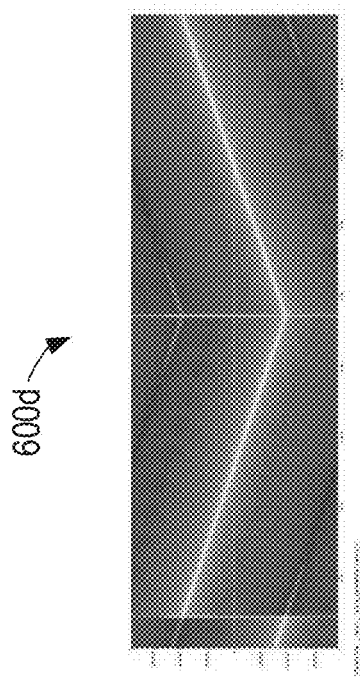
Figure 6D:
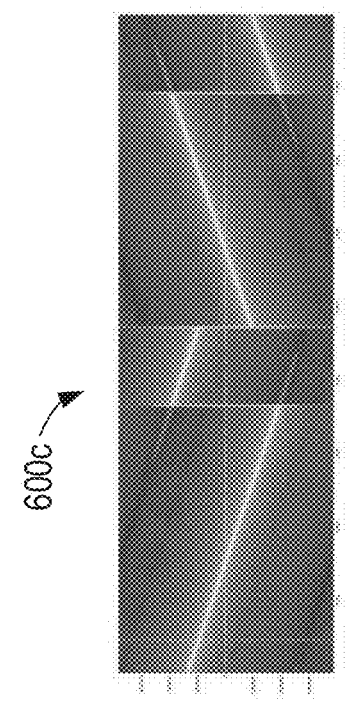

FIG. 5 shows an example process for determining a data rate of a received wireless signal, estimating the TO value $t_0$ and CFO value $f_0$ of the wireless signal, and decoding the payload of the wireless signal based at least in part on the data rate, the TO value $t_0$, and CFO value $f_0$.

A receiving device can receive a wireless signal 200 transmitted by a transmitting device. As described above the wireless signal 200 can include a first preamble 202 and a second preamble 204, where the first preamble 202 includes a ZC sequence having a root u and the second preamble 204 includes a ZC sequence having a root u', where u' is the inverse modulus of u. Further, as described above, the first preamble 202 and the second preamble 204 can be cyclically shifted by particular length, where the length depends on the data rate with which the wireless signal 200 is transmitted.

The receiving device identifies the preambles 202 and 204, and estimates a raw time offset value 504 and a center frequency offset value 506 (e.g., using a time offset and frequency offset detection module 502). In some implementations, the time offset and frequency offset detection module 502 can determine the raw time offset value 504 and the center frequency offset value 506 in a similar manner as described above (e.g., with reference to FIGS. 3 and 4). For example, the raw time offset value 504 can be determined according to the TO value estimation process described with reference to FIG. 4. Further, the center frequency offset value 506 can be determined according to the CFO value estimation process described with reference to FIG. 4.

Further, the receiving device can determine the data rate of the wireless signal using a cyclic shift mapping module 508. For example, as described above, a mapping table can specify a mapping between several data rates $R_1$, $R_2$, ... $R_N$, and several corresponding cyclic shift length $C_1$, $C_2$, ... $C_N$, respectively. The cyclic shift mapping module 508 can identify the cyclic shift length 510 from the mapping table that is closest in value to the raw time offset value 504, and determine that the data rate 512 of the wireless signal 200 is the data rate corresponding to the identified cyclic shift length 510 in the mapping table.

As an example, a mapping table can specify several data rates including 800 kbps, 400 kbps, 200 kbps, and 100 kbps, and corresponding cyclic shift lengths of 0, 100 milliseconds, 200 milliseconds, and 300 milliseconds, respectively. If the raw time offset value 504 is 110 milliseconds, the cyclic shift mapping module 508 can determine that the cyclic shift length 510 is 100 milliseconds (e.g., the cyclic shift length that is closest in value to 110 millisecond raw time offset value). Further, the cyclic shift mapping module 508 can determine that the data rate 512 of the wireless signal 200 is 400 kbps (e.g., the data rate corresponding to a 100 milliseconds cyclic shift length in the mapping table).

As another example, a mapping table can specify several data rates including 200 kbps, 100 kbps, 50 kbps, and 25 kbps, and corresponding cyclic shift lengths of 0, 200 milliseconds, 400 milliseconds, and 600 milliseconds, respectively. If the raw time offset value 504 is 380 milliseconds, the cyclic shift mapping module 508 can determine that the cyclic shift length 510 is 400 milliseconds (e.g., the cyclic shift length that is closest in value to 380 millisecond raw time offset value). Further, the cyclic shift mapping module 508 can determine that the data rate 512 of the wireless signal 200 is 50 kbps (e.g., the data rate corresponding to a 400 milliseconds cyclic shift length in the mapping table).

Further, the cyclic shift removal module 514 can determine a residual cyclic shift value 516 of the preambles 202 and 204. The residual cyclic shift value 516 can be, for example, the time offset of the preambles 202 and 204 that are not attributable to the cyclic shift in the preambles 202 and 204.

As an example, a mapping table can specify several data rates including 800 kbps, 400 kbps, 200 kbps, and 100 kbps, and corresponding cyclic shift lengths of 0, 100 milliseconds, 200 milliseconds, and 300 milliseconds, respectively. If the raw time offset value 504 is 180 milliseconds, the receiving device can determine that the cyclic shift length 510 is 200 milliseconds (e.g., the cyclic shift length that is closest in value to 180 millisecond raw time offset value). Further, the receiving device can determine that the residual cyclic shift value 516 is 20 milliseconds (e.g., the difference between the raw time offset value 504 and the cyclic shift length 510).

As another example, a mapping table can specify several data rates including 200 kbps, 100 kbps, 50 kbps, and 25 kbps, and corresponding cyclic shift lengths of 0, 200 milliseconds, 400 milliseconds, and 600 milliseconds, respectively. If the raw time offset value 504 is 380 milliseconds, the receiving device can determine that the cyclic shift length 510 is 400 milliseconds (e.g., the cyclic shift length that is closest in value to 380 millisecond raw time offset value). Further, the receiving device can determine that the residual cyclic shift value 516 is −20 milliseconds (e.g., the difference between the raw time offset value 504 and the cyclic shift length 510).

In turn, the receiving device can decode the payload 206 of the wireless signal 200 to obtain decoded data 520 (e.g., using a payload decoding module 518). The a payload decoding module 518 can obtain the decoded data 520 based at least in part on the data rate 512, the residual cyclic shift value 516, and the center frequency offset value 506.

For example, the payload decoding module 518 can determine, based at least in part on the residual cyclic shift value 516 and the data rate 512, to the time(s) at which to sample the wireless signal for the payload (e.g., to account for time offsets in the transmitted and receiving of the wireless signal 200, such as those due to propagation delay of the wireless signal 200). For instance, the payload decoding module 518 can determine the starting point of the payload and/or the ending point of the payload in the wireless signal.

As another example, the payload decoding module 518 can determine, based at least in part on use the center frequency offset value 506 and the data rate 512, the spectral components of the wireless signal that correspond to the carrier signal of the wireless signal 200 (e.g., to account for frequency offsets, such as those due to Doppler shift and/or differences between the local oscillators of the transmitting and receiving devices).

FIGS. 6A-6D show spectra of four example ZC sequences 600a-600d, each ZC sequence having a root of 1. In these examples, the ZC sequence 600a corresponds to a first data rate $R_1$, and has been cyclically shifted by a first length $C_1$. Further, the ZC sequence 600b corresponds to a second data rate $R_2$, and has been cyclically shifted by a second length $C_2$. Further, the ZC sequence 600c corresponds to a third data rate $R_3$, and has been cyclically shifted by a third length $C_3$. Further, the ZC sequence 600d corresponds to a fourth data rate $R_4$, and has been cyclically shifted by a fourth length $C_4$.

Although four example ZC sequences 600a-600d are shown in FIGS. 6A-6D, each having a different cyclic shift length, in practice, a system can generate preambles having any number of different cyclic shift length (e.g., to indicate any number of different data rates for transmitting a wireless signal).

Figure 7A:
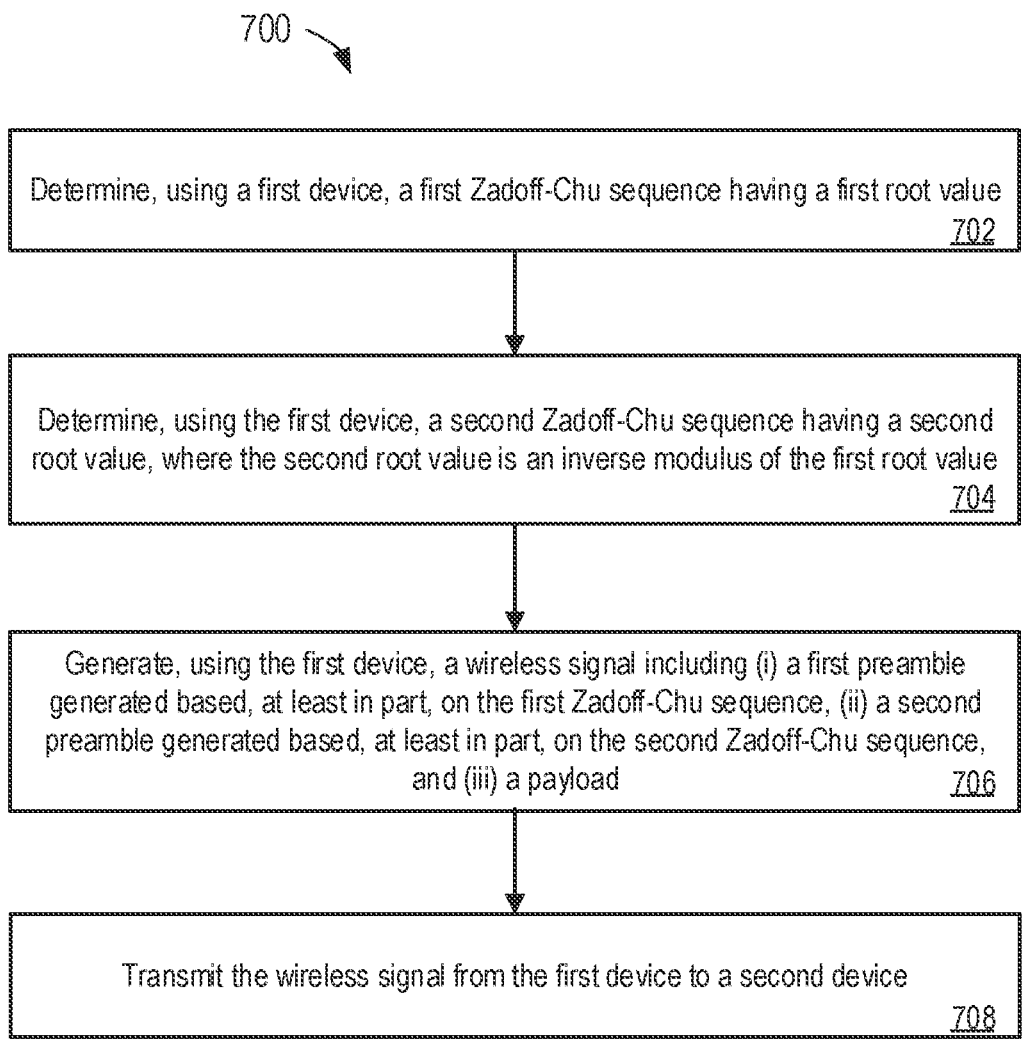
FIG. 7A is a flow chart diagram of an example process for synchronizing wireless communications between electronic devices.

FIG. 7A shows an example process 700 for synchronizing wireless communications between electronic devices. The process 700 can be performed for example, one or more of the components of the system 100 shown in FIG. 1 (e.g., the first electronic device 102a and/or the second electronic device 102b).

In the process 700, a first device determines a first Zadoff-Chu sequence having a first root value (block 702).

Further, the first device determines a second Zadoff-Chu sequence having a second root value (block 704). The second root value is an inverse modulus of the first root value. As an example, a modular inverse of an integer b (modulo m) is the integer $b^{-1}$, such that $bb^{-1} \equiv 1 \pmod{m}$.

Further, the first device generates a wireless signal (block 706). The wireless signal includes a first preamble generated based, at least in part, on the first Zadoff-Chu sequence. The wireless signal also includes a second preamble generated based, at least in part, on the second Zadoff-Chu sequence. The wireless signal also includes a payload. Example techniques for generating preambles are described, for example, with reference to FIGS. 2, 3A, and 3B.

In some implementations, the first preamble can precede the second preamble. In some implementations, the first preamble and the second preamble can precede the payload. A schematic representation of an example wireless signal 200 is shown in FIG. 2.

In some implementations, the wireless signal is generated independent of determining a Fourier transform of the first preamble. As an example, as described with reference to FIG. 3, instead of determining a Fourier transform of the first preamble 202, the first device can use the second preamble 204 instead (e.g., as an equivalent to the first preamble 202).

Further, the first device transmits the wireless signal to a second device (block 708).

In some implementations, the wireless signal can be generated according to a cyclic shift technique (e.g., whereby a length or shift value of a cyclic shift of one or more both of the preambles depends on the data rate for transmitting the wireless signal). As an example, the wireless signal can be generated, at least in part, by performing a first cyclic shift on the first preamble according to a shift value and/or performing a second cyclic shift on the second preamble according to the shift value.

Further, in some implementations, the wireless signal can be transmitted from the first device to a second device according to a data rate, and the shift value can be determined based, at least in part, on the data rate.

Further, in some implementations, the shift value can be selected from among a plurality of candidate shift values, where each of the candidate shift values corresponds to a different respective data rate for transmitting the wireless signal from the first device to the second device. In some implementations, the relationship between the shift values and data rate can be represented using a mapping table (e.g., the mapping table shown in Table 1).

In some implementations, the candidate shift values can define an arithmetic sequence. For example, candidate shift values cyclic shift values can increase in increments of D for each successively greater data rate.

In some implementations, the first device can be a base station of a wireless network and/or a user equipment (UE) of a wireless network.

In some implementations, the second device can be a base station of a wireless network and/or a user equipment (UE) of a wireless network.

In some implementations, the process 700 can be performed, at least in part, a baseband processor of the first device.

Figure 7B:
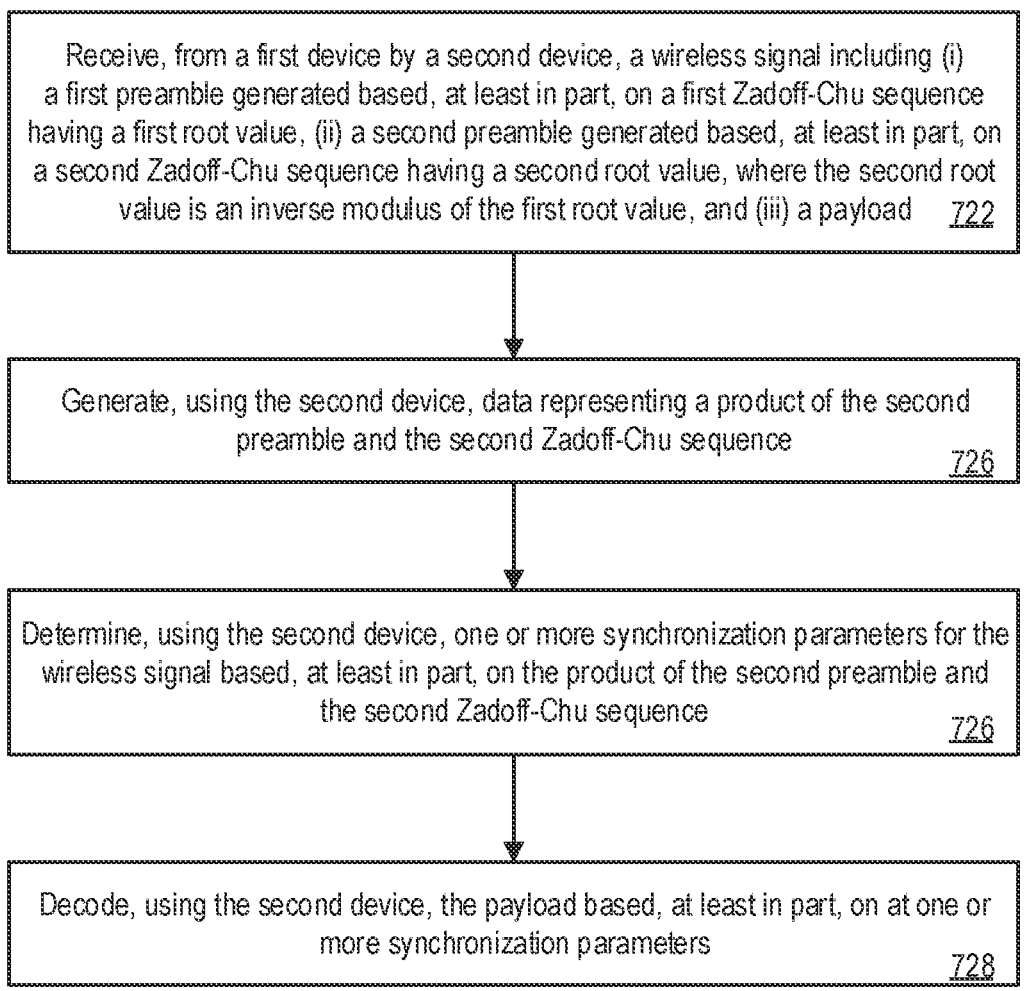
FIG. 7B is a flow chart diagram of another example process for synchronizing wireless communications between electronic devices.

FIG. 7B shows another example process 720 for synchronizing wireless communications between electronic devices. The process 720 can be performed for example, one or more of the components of the system 100 shown in FIG. 1 (e.g., the first electronic device 102a and/or the second electronic device 102b).

In the process 720, a second device receives a wireless signal from a first device (block 722). The wireless signal includes a first preamble generated based, at least in part, on a first Zadoff-Chu sequence having a first root value. The wireless signal also includes a second preamble generated based, at least in part, on a second Zadoff-Chu sequence having a second root value. The second root value is an inverse modulus of the first root value. The wireless signal also includes a payload.

In some implementations, the first preamble can precede the second preamble. In some implementations, the first preamble and the second preamble can precede the payload. A schematic representation of an example wireless signal 200 is shown in FIG. 2.

In some implementations, the first root value and/or the second root value can be determined prior to receiving the wireless signal. For example, the first root value and/or the second root value can the root u can be a predetermined value (e.g., a value that is communicated other otherwise provided to the first device and/or the second device prior to the transmission of the wireless signal).

Further, the second device generates data representing a product of the second preamble and the second Zadoff-Chu sequence (block 724).

Further, the second device determines one or more synchronization parameters for the wireless signal based, at least in part, on the product of the second preamble and the second Zadoff-Chu sequence (block 726). The one or more synchronization parameters can include a time offset value (e.g., a time offset value $t_0$) and/or a frequency offset value (e.g., a carrier frequency offset value $f_0$).

In some implementations, the one or more synchronization parameters can be determined, at least in part, by determining an inverse Fourier transform of the product of the second preamble and the second Zadoff-Chu sequence. Further, one or more peaks of the result of the inverse Fourier transform can be determined. Further, the one or more synchronization parameters can be determined based, at least in part, on the one or more peaks.

Further, the second device decodes the payload based, at least in part, on at one or more synchronization parameters (block 728).

In some implementations, the first device can be a base station of a wireless network and/or a user equipment (UE) of a wireless network.

In some implementations, the second device can be a base station of a wireless network and/or a user equipment (UE) of a wireless network.

In some implementations, the process 700 can be performed, at least in part, a baseband processor of the second device.

In some implementations, the wireless signal can be interpreted according to a cyclic shift technique (e.g., whereby a length or shift value of a cyclic shift of one or more both of the preambles depends on the data rate for transmitting the wireless signal).

As an example, the payload portion can be decoded, at least in part, by determining a first cyclic shift associated with the first preamble and/or determining a second cyclic shift associated with the second preamble.

Further, the payload can be decoded, at least in part, by determining a shift value of at least one of the first cyclic shift or the second cyclic shift, and determining, based at least in part, on the determined shift value, a data rate for a transmission of the wireless signal from the first device to the second device.

In some implementations, the shift value can be selected from among a plurality of candidate shift values, where each of the candidate shift values corresponds to a different respective data rate for transmitting the wireless signal from the first device to the second device. In some implementations, the relationship between the shift values and data rate can be represented using a mapping table (e.g., the mapping table shown in Table 1).

In some implementations, the candidate shift values can define an arithmetic sequence. For example, candidate shift values cyclic shift values can increase in increments of D for each successively greater data rate.

In some implementations, the first cyclic shift and/or the second cyclic shift can be determined, at least in part, by determining a time offset value for the wireless signal, and identifying a first candidate shift value from among the candidate shift values that is nearest in value to the time offset value.

Figure 8:
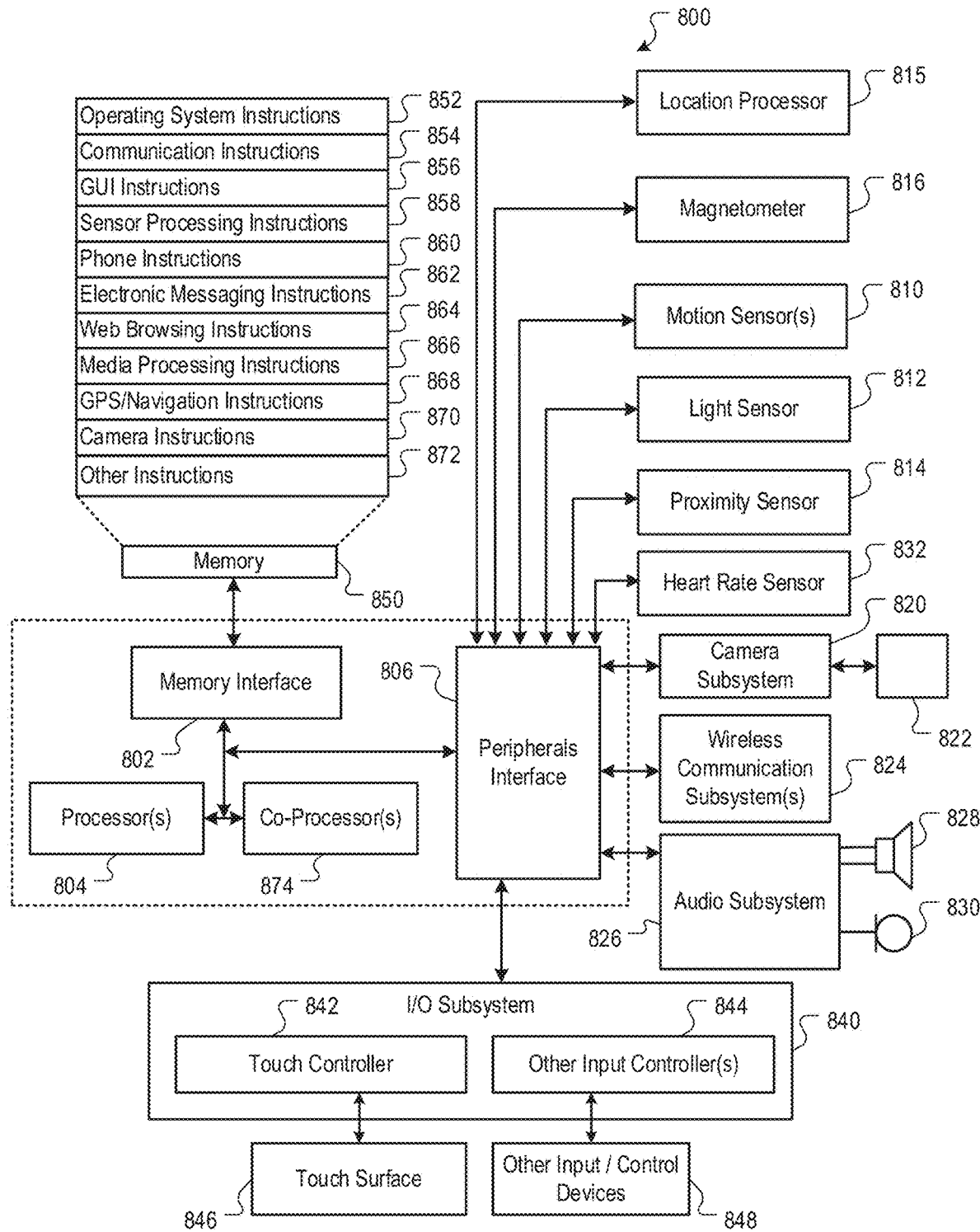
FIG. 8 is a block diagram of an example architecture for implementing the features and processes described in reference to FIGS. 1-7B.

FIG. 8 is a block diagram of an example device architecture 800 for implementing the features and processes described in reference to FIGS. 1-7B. For example, the architecture 800 can be used to implement the first electronic device 102a and/or the second electronic device 102b. Architecture 800 may be implemented in any device for generating the features described in reference to FIGS. 1-7B, including but not limited to desktop computers, server computers, portable computers, smart phones, tablet computers, game consoles, wearable computers, set top boxes, media players, smart TVs, and the like.

The architecture 800 can include a memory interface 802, one or more data processor 804, one or more data co-processors 874, and a peripherals interface 806. The memory interface 802, the processor(s) 804, the co-processor(s) 874, and/or the peripherals interface 806 can be separate components or can be integrated in one or more integrated circuits. One or more communication buses or signal lines may couple the various components.

The processor(s) 804 and/or the co-processor(s) 874 can operate in conjunction to perform the operations described herein. For instance, the processor(s) 804 can include one or more central processing units (CPUs) that are configured to function as the primary computer processors for the architecture 800. As an example, the processor(s) 804 can be configured to perform generalized data processing tasks of the architecture 800. Further, at least some of the data processing tasks can be offloaded to the co-processor(s) 874. For example, specialized data processing tasks, such as processing motion data, processing image data, encrypting data, and/or performing certain types of arithmetic operations, can be offloaded to one or more specialized co-processor(s) 874 for handling those tasks. In some cases, the processor(s) 804 can be relatively more powerful than the co-processor(s) 874 and/or can consume more power than the co-processor(s) 874. This can be useful, for example, as it enables the processor(s) 804 to handle generalized tasks quickly, while also offloading certain other tasks to co-processor(s) 874 that may perform those tasks more efficiency and/or more effectively. In some cases, a co-processor(s) can include one or more sensors or other components (e.g., as described herein), and can be configured to process data obtained using those sensors or components, and provide the processed data to the processor(s) 804 for further analysis.

Sensors, devices, and subsystems can be coupled to peripherals interface 806 to facilitate multiple functionalities. For example, a motion sensor 810, a light sensor 812, and a proximity sensor 814 can be coupled to the peripherals interface 806 to facilitate orientation, lighting, and proximity functions of the architecture 800. For example, in some implementations, a light sensor 812 can be utilized to facilitate adjusting the brightness of a touch surface 846. In some implementations, a motion sensor 810 can be utilized to detect movement and orientation of the device. For example, the motion sensor 810 can include one or more accelerometers (e.g., to measure the acceleration experienced by the motion sensor 810 and/or the architecture 800 over a period of time), and/or one or more compasses or gyros (e.g., to measure the orientation of the motion sensor 810 and/or the mobile device). In some cases, the measurement information obtained by the motion sensor 810 can be in the form of one or more time-varying signals (e.g., a time-varying plot of an acceleration and/or an orientation over a period of time). Further, display objects or media may be presented according to a detected orientation (e.g., according to a "portrait" orientation or a "landscape" orientation). In some cases, a motion sensor 810 can be directly integrated into a co-processor 874 configured to processes measurements obtained by the motion sensor 810. For example, a co-processor 874 can include one more accelerometers, compasses, and/or gyroscopes, and can be configured to obtain sensor data from each of these sensors, process the sensor data, and transmit the processed data to the processor(s) 804 for further analysis.

Other sensors may also be connected to the peripherals interface 806, such as a temperature sensor, a biometric sensor, or other sensing device, to facilitate related functionalities. As an example, as shown in FIG. 8, the architecture 800 can include a heart rate sensor 832 that measures the beats of a user's heart. Similarly, these other sensors also can be directly integrated into one or more co-processor(s) 874 configured to process measurements obtained from those sensors.

A location processor 815 (e.g., a GNSS receiver chip) can be connected to the peripherals interface 806 to provide geo-referencing. An electronic magnetometer 816 (e.g., an integrated circuit chip) can also be connected to the peripherals interface 806 to provide data that may be used to determine the direction of magnetic North. Thus, the electronic magnetometer 816 can be used as an electronic compass.

A camera subsystem 820 and an optical sensor 822 (e.g., a charged coupled device [CCD] or a complementary metal-oxide semiconductor [CMOS] optical sensor) can be utilized to facilitate camera functions, such as recording photographs and video clips.

Communication functions may be facilitated through one or more communication subsystems 824. The communication subsystem(s) 824 can include one or more wireless and/or wired communication subsystems. For example, wireless communication subsystems can include radio frequency receivers and transmitters (e.g., satellite transceivers, Wi-Fi transceivers, cellular transceivers, etc.), and/or optical (e.g., infrared) receivers and transmitters. As another example, wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. Further, the communication subsystem(s) 824 can include one or more baseband processors to perform or otherwise facilitate the performance of the operations described herein.

The specific design and implementation of the communication subsystem 824 can depend on the communication network(s) or medium(s) over which the architecture 800 is intended to operate. For example, the architecture 800 can include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. The wireless communication subsystems can also include hosting protocols such that the architecture 800 can be configured as a base station for other wireless devices. As another example, the communication subsystems may allow the architecture 800 to synchronize with a host device using one or more protocols, such as, for example, the TCP/IP protocol, HTTP protocol, UDP protocol, and any other known protocol.

An audio subsystem 826 can be coupled to a speaker 828 and one or more microphones 830 to facilitate voice-enabled functions, such as voice recognition, voice replication, digital recording, and telephony functions.

An I/O subsystem 840 can include a touch controller 842 and/or other input controller(s) 844. The touch controller 842 can be coupled to a touch surface 846. The touch surface 846 and the touch controller 842 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch surface 846. In one implementation, the touch surface 846 can display virtual or soft buttons and a virtual keyboard, which can be used as an input/output device by the user.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of the speaker 828 and/or the microphone 830.

In some implementations, the architecture 800 can present recorded audio and/or video files, such as MP3, AAC, and MPEG video files. In some implementations, the architecture 800 can include the functionality of an MP3 player and may include a pin connector for tethering to other devices. Other input/output and control devices may be used.

A memory interface 802 can be coupled to a memory 850. The memory 850 can include high-speed random access memory or non-volatile memory, such as one or more magnetic disk storage devices, one or more optical storage devices, or flash memory (e.g., NAND, NOR). The memory 850 can store an operating system 852, such as Darwin, RTXC, LINUX, UNIX, MACOS, WINDOWS, IOS, or an embedded operating system such as VxWorks. The operating system 852 can include instructions for handling basic system services and for performing hardware dependent tasks. In some implementations, the operating system 852 can include a kernel (e.g., UNIX kernel).

The memory 850 can also store communication instructions 854 to facilitate communicating with one or more additional devices, one or more computers or servers, including peer-to-peer communications. The communication instructions 854 can also be used to select an operational mode or communication medium for use by the device, based on a geographic location (obtained by the GPS/Navigation instructions 868) of the device. The memory 850 can include graphical user interface instructions 856 to facilitate graphic user interface processing, including a touch model for interpreting touch inputs and gestures; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 869 to facilitate GPS and navigation-related processes; camera instructions 870 to facilitate camera-related processes and functions; and other instructions 872 for performing some or all of the processes described herein.

Each of the above identified instructions and applications can correspond to a set of instructions for performing one or more functions described herein. These instructions need not be implemented as separate software programs, procedures, or modules. The memory 850 can include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Several example embodiments are described below.

Example 1 can include method that includes: determining, using a first device, a first Zadoff-Chu sequence having a first root value; determining, using the first device, a second Zadoff-Chu sequence having a second root value, where the second root value is an inverse modulus of the first root value; generating, using the first device, a wireless signal including: a first preamble generated based, at least in part, on the first Zadoff-Chu sequence, a second preamble generated based, at least in part, on the second Zadoff-Chu sequence, and a payload; and transmitting the wireless signal from the first device to a second device.

Example 2 can include the method of Example 1. Further, generating the wireless signal can at least one of: performing a first cyclic shift on the first preamble according to a shift value, or performing a second cyclic shift on the second preamble according to the shift value.

Example 3 can include the method of Example 2. Further, the wireless signal can be transmitted from the first device to a second device according to a data rate, and the shift value can be determined based, at least in part, on the data rate.

Example 4 can include the method of Example 2. Further, the shift value can be selected from among a plurality of candidate shift values, and each of the candidate shift values can correspond to a different respective data rate for transmitting the wireless signal from the first device to the second device.

Example 5 can include the method of Example 4. Further, the candidate shift values can define an arithmetic sequence.

Example 6 can include the method of Example 1. Further, the first preamble can precede the second preamble.

Example 7 can include the method of Example 1. Further, the first preamble and the second preamble can precede the payload.

Example 8 can include the method of Example 1. Further, the wireless signal can be generated independent of determining a Fourier transform of the first preamble.

Example 9 can include the method of Example 1. Further, at least one of the first device or the second device can be a base station of a wireless network.

Example 10 can include the method of Example 1. Further, at least one of the first device or the second device can be a user equipment (UE) of a wireless network.

Example 11 can include the method of Example 1. Further, the method can be performed, at least in part, by a baseband processor of the first device.

Example 12 can include a system that includes one or more processors; and memory storing instructions that when executed by the one or more processors, cause the one or more processors to perform operations including: determining, using a first device, a first Zadoff-Chu sequence having a first root value; determining, using the first device, a second Zadoff-Chu sequence having a second root value, where the second root value is an inverse modulus of the first root value; generating, using the first device, a wireless signal including: a first preamble generated based, at least in part, on the first Zadoff-Chu sequence, a second preamble generated based, at least in part, on the second Zadoff-Chu sequence, and a payload; and transmitting the wireless signal from the first device to a second device.

Example 13 can include one or more non-transitory, computer-readable storage media having instructions stored thereon, that when executed by one or more processors, cause the one or more processors to perform operations including: determining, using a first device, a first Zadoff-Chu sequence having a first root value; determining, using the first device, a second Zadoff-Chu sequence having a second root value, where the second root value is an inverse modulus of the first root value; generating, using the first device, a wireless signal including: a first preamble generated based, at least in part, on the first Zadoff-Chu sequence, a second preamble generated based, at least in part, on the second Zadoff-Chu sequence, and a payload; and transmitting the wireless signal from the first device to a second device.

Example 14 can include a method that includes: receiving, from a first device by a second device, a wireless signal including: a first preamble generated based, at least in part, on a first Zadoff-Chu sequence having a first root value, a second preamble generated based, at least in part, on a second Zadoff-Chu sequence having a second root value, where the second root value is an inverse modulus of the first root value, and a payload; generating, using the second device, data representing a product of the second preamble and the second Zadoff-Chu sequence; determining, using the second device, one or more synchronization parameters for the wireless signal based, at least in part, on the product of the second preamble and the second Zadoff-Chu sequence; and decoding, using the second device, the payload based, at least in part, on at one or more synchronization parameters.

Example 15 can include the method of Example 14. Further, decoding the payload portion can including determining at least one of: a first cyclic shift associated with the first preamble, or a second cyclic shift associated with the second preamble.

Example 16 can include the method of Example 15. Further, decoding the payload can include determining a shift value of at least one of the first cyclic shift or the second cyclic shift; and determining, based at least in part, on the determined shift value, a data rate for a transmission of the wireless signal from the first device to the second device.

Example 17 can include the method of Example 16. Further, the shift value can be selected from among a plurality of candidate shift values, and each of the candidate shift values can correspond to a different respective data rate for transmitting the wireless signal from the first device to the second device.

Example 18 can include the method of Example 17. Further, the candidate shift values can define an arithmetic sequence.

Example 19 can include the method of Example 16. Further, determining the first cyclic shift or the second cyclic shift can include determining a time offset value for the wireless signal, and identifying a first candidate shift value from among the candidate shift values that is nearest in value to the time offset value.

Example 20 can include the method of Example 14. Further, the one or more synchronization parameters can include a time offset value.

Example 21 can include the method of Example 14. Further, the one or more synchronization parameters can include a frequency offset value.

Example 22 can include the method of Example 14. Further, determining the one or more synchronization parameters can include determining an inverse Fourier transform of the product of the second preamble and the second Zadoff-Chu sequence.

Example 23 can include the method of Example 22. Further, determining the one or more synchronization parameters can include determining one or more peaks of the inverse Fourier transform of the product of the second preamble and the second Zadoff-Chu sequence.

Example 24 can include the method of Example 23. Further, determining the one or more synchronization parameters can include determining the one or more synchronization parameters based, at least in part, on the one or more peaks.

Example 25 can include the method of Example 14. Further, at least one of the first root value or the second root value can be determined prior to receiving the wireless signal.

Example 26 can include the method of Example 14. Further, the first preamble can precede the second preamble.

Example 27 can include the method of Example 14. Further, the first preamble and the second preamble can precede the payload.

Example 28 can include the method of Example 14. Further, at least one of the first device or the second device can be a base station of a wireless network.

Example 29 can include the method of Example 14. Further, at least one of the first device or the second device can be a user equipment (UE) of a wireless network.

Example 30 can include the method of Example 14. Further, the method can be performed, at least in part, by a baseband processor of the second device.

Example 31 includes a system that includes: one or more processors; and memory storing instructions that when executed by the one or more processors, cause the one or more processors to perform operations including: receiving, from a first device by a second device, a wireless signal including: a first preamble generated based, at least in part, on a first Zadoff-Chu sequence having a first root value, a second preamble generated based, at least in part, on a second Zadoff-Chu sequence having a second root value, wherein the second root value is an inverse modulus of the first root value, and a payload; generating, using the second device, data representing a product of the second preamble and the second Zadoff-Chu sequence; determining, using the second device, one or more synchronization parameters for the wireless signal based, at least in part, on the product of the second preamble and the second Zadoff-Chu sequence; and decoding, using the second device, the payload based, at least in part, on at one or more synchronization parameters.

Example 32 can include one or more non-transitory, computer-readable storage media having instructions stored thereon, that when executed by one or more processors, cause the one or more processors to perform operations including: receiving, from a first device by a second device, a wireless signal including: a first preamble generated based, at least in part, on a first Zadoff-Chu sequence having a first root value, a second preamble generated based, at least in part, on a second Zadoff-Chu sequence having a second root value, wherein the second root value is an inverse modulus of the first root value, and a payload; generating, using the second device, data representing a product of the second preamble and the second Zadoff-Chu sequence; determining, using the second device, one or more synchronization parameters for the wireless signal based, at least in part, on the product of the second preamble and the second Zadoff-Chu sequence; and decoding, using the second device, the payload based, at least in part, on at one or more synchronization parameters.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   determining, using a first device, a first Zadoff-Chu sequence having a first root value;
   determining, using the first device, a second Zadoff-Chu sequence having a second root value, wherein the second root value is an inverse modulus of the first root value;
   generating, using the first device, a wireless signal comprising:
     a first preamble generated based, at least in part, on the first Zadoff-Chu sequence,
     a second preamble generated based, at least in part, on the second Zadoff-Chu sequence, and
     a payload; and
   transmitting the wireless signal from the first device to a second device.

2. The method of claim 1, wherein generating the wireless signal comprises at least one of:
   performing a first cyclic shift on the first preamble according to a shift value, or
   performing a second cyclic shift on the second preamble according to the shift value.

3. The method of claim 2, wherein the wireless signal is transmitted from the first device to a second device according to a data rate, and
   wherein the shift value is determined based, at least in part, on the data rate.

4. The method of claim 2, wherein the shift value is selected from among a plurality of candidate shift values, and
   wherein each of the candidate shift values corresponds to a different respective data rate for transmitting the wireless signal from the first device to the second device.

5. The method of claim 4, wherein the candidate shift values define an arithmetic sequence.

6. The method of claim 1, wherein the first preamble and the second preamble precede the payload.

7. The method of claim 1, wherein the wireless signal is generated independent of determining a Fourier transform of the first preamble.

8. A baseband processor configured to perform operations comprising: determining, using a first device, a first Zadoff-Chu sequence having a first root value;
   determining, using the first device, a second Zadoff-Chu sequence having a second root value, wherein the second root value is an inverse modulus of the first root value;
   generating, using the first device, a wireless signal comprising:
     a first preamble generated based, at least in part, on the first Zadoff-Chu sequence,
     a second preamble generated based, at least in part, on the second Zadoff- Chu sequence, and
     a payload; and
   transmitting the wireless signal from the first device to a second device.

9. A method comprising:
   receiving, from a first device by a second device, a wireless signal comprising:
     a first preamble generated based, at least in part, on a first Zadoff-Chu sequence having a first root value,
     a second preamble generated based, at least in part, on a second Zadoff-Chu sequence having a second root value, wherein the second root value is an inverse modulus of the first root value, and
     a payload;
   generating, using the second device, data representing a product of the second preamble and the second Zadoff-Chu sequence;
   determining, using the second device, one or more synchronization parameters for the wireless signal based, at least in part, on the product of the second preamble and the second Zadoff-Chu sequence; and
   decoding, using the second device, the payload based, at least in part, on at one or more synchronization parameters.

10. The method of claim 9, wherein decoding the payload comprises:
    determining at least one of:
      a first cyclic shift associated with the first preamble, or
      a second cyclic shift associated with the second preamble.

11. The method of claim 10, wherein decoding the payload comprises:
    determining a shift value of at least one of the first cyclic shift or the second cyclic shift; and
    determining, based at least in part, on the determined shift value, a data rate for a transmission of the wireless signal from the first device to the second device.

12. The method of claim 11, wherein the shift value is selected from among a plurality of candidate shift values, and
    wherein each of the candidate shift values corresponds to a different respective data rate for transmitting the wireless signal from the first device to the second device.

13. The method of claim 12, wherein the candidate shift values define an arithmetic sequence.

14. The method of claim 11, wherein determining the first cyclic shift or the second cyclic shift comprises:
    determining a time offset value for the wireless signal, and
    identifying a first candidate shift value from among the candidate shift values that is nearest in value to the time offset value.

15. The method of claim 9, wherein the one or more synchronization parameters comprises a time offset value.

16. The method of claim 9, wherein the one or more synchronization parameters comprises a frequency offset value.

17. The method of claim 9, wherein determining the one or more synchronization parameters comprises:
    determining an inverse Fourier transform of the product of the second preamble and the second Zadoff-Chu sequence.

18. The method of claim 17, wherein determining the one or more synchronization parameters comprises:
    determining one or more peaks of the inverse Fourier transform of the product of the second preamble and the second Zadoff-Chu sequence.

19. The method of claim 18, wherein determining the one or more synchronization parameters comprises:
    determining the one or more synchronization parameters based, at least in part, on the one or more peaks.

20. The method of claim 9, wherein at least one of the first root value or the second root value is determined prior to receiving the wireless signal.

\* \* \* \* \*